United States Patent [19]

Nasu

[11] Patent Number: 5,901,290
[45] Date of Patent: *May 4, 1999

[54] DATA TRANSFER APPARATUS FOR TRANSFERRING DATA FIXEDLY IN PREDETERMINED TIME INTERVAL WITHOUT A TRANSMITTER CHECKING A SIGNAL FROM A RECEIVER

[75] Inventor: Yasuyuki Nasu, Yamanashi, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/613,578

[22] Filed: Mar. 12, 1996

[30] Foreign Application Priority Data

Mar. 15, 1995 [JP] Japan .................. 7-055315

[51] Int. Cl.$^6$ .................. G06F 5/06; G06F 1/12
[52] U.S. Cl. .................. 395/200.61; 395/200.49
[58] Field of Search .................. 395/200.13, 250, 395/849, 200.61, 200.49

[56] References Cited

U.S. PATENT DOCUMENTS

| | | | |
|---|---|---|---|
| 4,229,815 | 10/1980 | Cummiskey | 370/358 |
| 4,288,860 | 9/1981 | Trost | 395/494 |
| 4,551,842 | 11/1985 | Segarra | 371/5.1 |
| 4,736,336 | 4/1988 | Girard . | |
| 4,866,609 | 9/1989 | Calta et al. | 395/874 |
| 5,058,054 | 10/1991 | Feldman | 395/849 |
| 5,369,747 | 11/1994 | Muranoi | 711/158 |
| 5,513,326 | 4/1996 | Nute | 395/880 |
| 5,524,270 | 6/1996 | Haess et al. | 395/880 |
| 5,592,627 | 1/1997 | Burt et al. | 395/200.13 |
| 5,592,629 | 1/1997 | Gamble | 395/250 |
| 5,619,544 | 4/1997 | Lewis et al. | 375/377 |
| 5,623,607 | 4/1997 | Kodama et al. | 395/250 |
| 5,703,996 | 12/1997 | Omura et al. | 386/68 |

Primary Examiner—Meng-Ai T. An
Assistant Examiner—Gautam R. Patel
Attorney, Agent, or Firm—McGinn & Gibb, P.C.

[57] ABSTRACT

A data transfer apparatus controls a data transfer speed between a transmitter and a receiver operating asynchronously of each other. The apparatus includes a data buffer for buffering data from the transmitter and an address register for indexing the data buffer. The apparatus further includes a stage register for indicating operation phases of data transfer to the receiver. The address register is updated when the stage register holds a predetermined value.

23 Claims, 4 Drawing Sheets

DATA TRANSFER APPARATUS FOR TRANSFERRING DATA FIXEDLY IN PREDETERMINED TIME INTERVAL WITHOUT A TRANSMITTER CHECKING A SIGNAL FROM A RECEIVER

BACKGROUND OF THE INVENTION

The present invention relates to a data transfer apparatus, and more particularly to a data transfer apparatus which controls a data transfer speed between a transmitter and a receiver operating asynchronously of each other.

In a conventional data transfer scheme, the transmitter checks an acknowledge signal from the receiver to ensure a completion of a data transfer. When the speed of the receiver is lower than that of the transmitter, the transmitter temporarily stops sending the subsequent data until the receiver has completed the data reception, so that the data transfer is made at discrete time intervals.

This conventional data transfer scheme has such a problem that the transmitter must check the acknowledge signal from the receiver at each time of completion of a data transfer. Therefore, the data cannot be transferred at high speed.

SUMMARY OF THE INVENTION

In view of the foregoing problem of the conventional system, an object of the present invention is to provide a data transfer apparatus capable of transferring data at high speed without requiring any acknowledge signals from the receiver.

In a data transfer apparatus according to a first aspect of the present invention, the data transfer apparatus transfers data from a transmitter to a receiver fixedly in a predetermined time interval.

With the unique and unobvious structure of the present invention, the address for the data buffer is updated at predetermined time intervals so that the receiver can receive the data sufficiently fast.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

A data transfer apparatus in accordance with preferred embodiments of the present invention will be described in detail with reference to the accompanying drawings.

Figure 1:
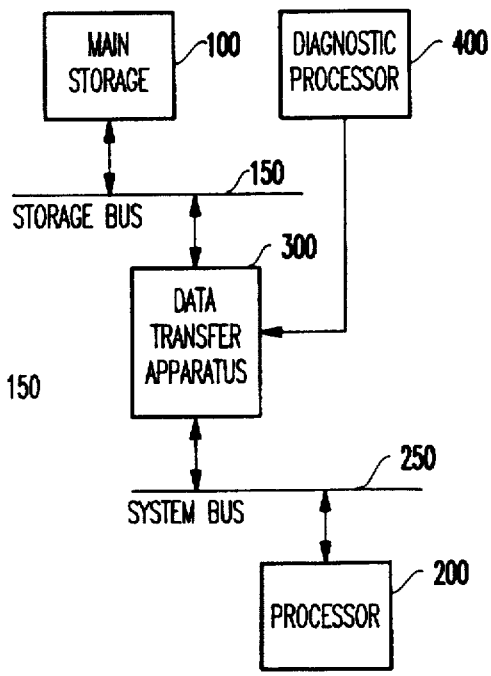
FIG. 1 is a block diagram showing the configuration of a computer system having an asynchronous data transfer apparatus according to an embodiment of the present invention.

Referring to FIG. 1, a computer system has a main storage 100, a storage bus 150 coupled to the main storage 100, a processor 200, a system bus 250 coupled to the processor 200, a data transfer apparatus 300 according to the present invention which connects between the main storage 100 and the processor 200 and specifically between the storage bus 150 and the system bus 250, a diagnostic processor 400 coupled to the data transfer apparatus 300, and providing an input thereto. The data transfer apparatus 300 transfers data from the main storage 100 to the processor 200.

In this case, the main storage 100 is a transmitter, and the processor 200 is a receiver. After the processor 200 requests a memory access to the main storage 100, the main storage 100 sends data toward the processor 200. For brevity, the memory request access operation will not be described in detail. The data is transferred to the data transfer apparatus 300 through the storage bus 150. Thereafter, the data is transferred to the processor 200 through the system bus 250. The diagnostic processor 400 inputs system parameters (e.g., a data transfer speed) to the data transfer apparatus 300.

Figure 2:
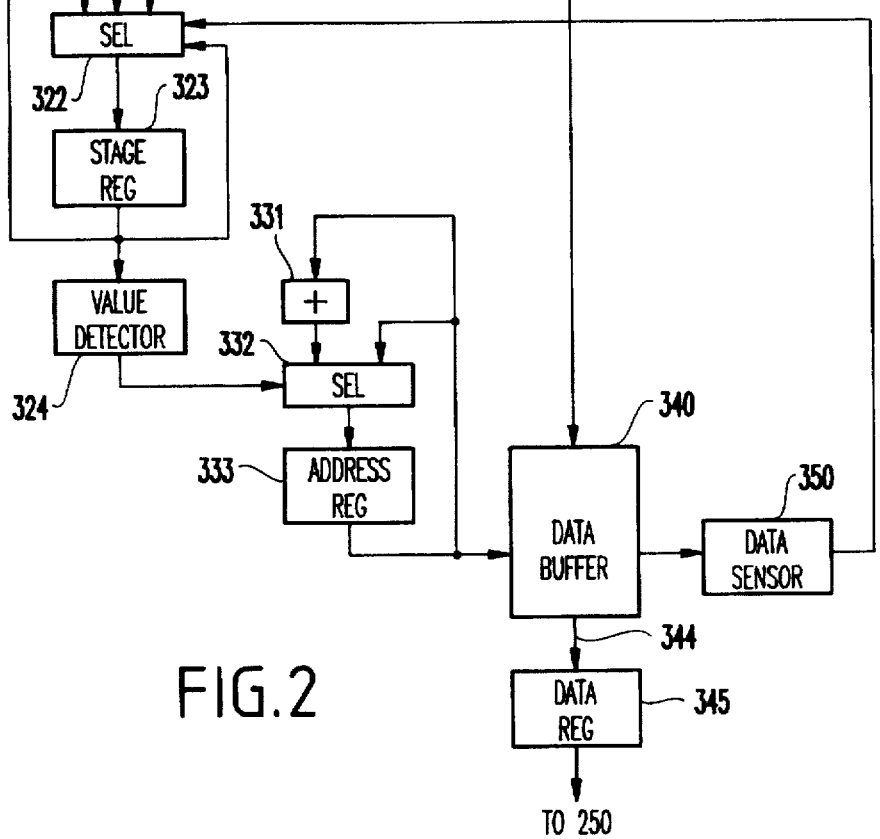
FIG. 2 is a block diagram showing the configuration of an asynchronous data transfer apparatus according to a first embodiment of the present invention.

Referring to FIG. 2, the data transfer apparatus 300 has a speed register 312 and an initial value memory 311 indexed by the speed register 312. The speed register 312 receives an input from the diagnostic processor 400. The data transfer apparatus 300 also has a stage register 323, a decrementer 321 for the stage register 323, a 3-way selector 322 coupled to an input of the stage register 323, and a value detector 324 for receiving an output from the stage register 323. The 3-way selector 322 selects an output of the initial value memory 311, an output of the stage register 323, and an output of the decrementer 321 under control of the output of the stage register 323 and an output of a data sensor 350.

The data transfer apparatus 300 also has an address register 333, a 2-way selector 332 coupled to an input of the address register 333, and an incrementer 331, coupled to the selector 332, for incrementing the address register 333. The data transfer apparatus 300 also has a data buffer 340 which receives an input from the storage bus 150 and is indexed by the address register 333, a data register 345 for receiving an output from the data buffer 340, and the data sensor 350 for receiving an output from the data buffer 340 and which provides an input to the selector 322.

The data buffer 340 stores the data from the storage bus 150 asynchronously in a First-In First-Out (FIFO) scheme. A data read from the data buffer 340 is stored into the data register 345, and then is transferred to the system bus 250. This data is read from the word of the data buffer 340, which is indexed by the address held in the address register 333.

The address register 333 holds the address for the data buffer 340. The address register 333 may be incremented by the incrementer 331. The 2-way selector 332 selects one of an output of the address register 333 and an output of the incrementer 331 depending on a control signal from the value detector 324. The 2-way selector 332 receives the control signal from the value detector 324, which is based on the output of stage register 323. Thus, the incrementer 331, the 2-way selector 332 and the address register 333 in combination form an address counter for indexing the data buffer 340.

The value detector 324 sends the control signal which indicates the increment of the address register 333 when the stage register 323 holds a predetermined value (e.g., "1"). The stage register 323 holds a transfer stage which more specifically, indicates an operation phase of data transfer to the receiver. For example, if a data transfer needs three clock cycles, the transfer stage is counted down such as, for example, "2", "1", and "0".

The stage register 323 may be decremented by the decrementer 321. The 3-way selector 322 selects one of an output of the decrementer 321, an output of the stage register 323, and an output of the initial value memory 311 depending on a control signal from data sensor 350 and an output from the stage register 323. Thus, the decrementer 321, the 3-way selector 322, the stage register 323 and the value detector 324 in combination form a phase counter for detecting a last phase of the transfer operation.

The initial value memory 311 stores initial values to be input to the stage register 323. The initial value memory 311 is indexed by the speed register 312. The speed register 312 holds a transfer speed ultimately to be used by the system bus 250. The speed register 312 may be set by the diagnostic processor 400 by an input therefrom. The data sensor 350 senses whether the data buffer 340 stores any data or not.

Figure 3:
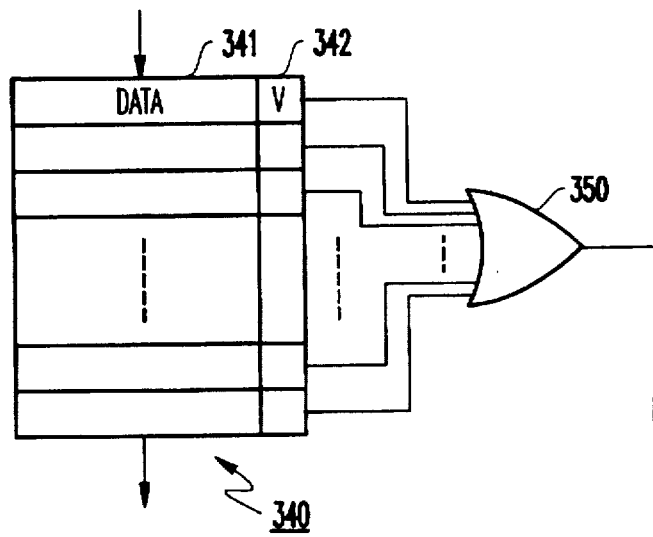
FIG. 3 is a block diagram showing the configuration of a data buffer and a data sensor in the asynchronous data transfer apparatus according to the first embodiment of the present invention.

Referring to FIG. 3, each entry of the data buffer 340 has at least a data portion 341 and a valid bit portion 342. The valid bit portion 342 indicates whether the data exists or not. For example, the data 341 exists if the valid bit portion 342 is "1". If the valid bit portion 342 is "0", then no data 341 exists in that entry. Then, the data sensor 350 has a function of, for example, an OR gate as shown in FIG. 3. If an output of the data sensor 350 is "1", it is determined that the data buffer 340 has some data.

Referring to FIG. 2, the 3-way selector 322 receives an output from the stage register 323 and an output from the data sensor 350 as control signals. If the output of the stage register 323 is other than "0", the 3-way selector 322 selects the output of the decrementer 321. Thus, the stage register 323 is decremented.

If the output of the stage register 323 is "0" and the output of the data sensor 350 is "0", the 3-way selector selects the output of the stage register 323. Thus, the content of the stage register 323 still remains as it is (e.g., it is not decremented).

If the output of the stage register 323 is "0" and the output of the data sensor 350 is "1", the 3-way selector selects the output of the initial value memory 311. Thus, the stage register 323 is set to one of the initial values.

The initial values in the initial value memory 311 are chosen based on predetermined criteria according to the designer's constraints. Some exemplary criteria are shown below.

For example, a transfer clock cycle of the processor 200 is defined as "P", and a clock cycle of the data transfer apparatus 300 is defined as "A". A desirable initial value "D" is represented as "A/P - 1". If the desirable initial value "D" is not found in the initial value memory 311, the least (or the lowest) value of candidate initial values that are greater than "D" should be selected preferably as the initial value "I".

For example, if the transfer clock cycle of the processor 200 is "40 |ns|" and the clock cycle of the data transfer apparatus is "10 |ns|", a desirable initial value would be "3". If the initial value memory 311 has values of "2" (word #0), "4" (word #1), "6" (word #2), and "8" (word #3), the value "4" is selected as initial value. Thus, the diagnostic processor 400 sets the word number "#1" to the speed register 312.

Figure 4:
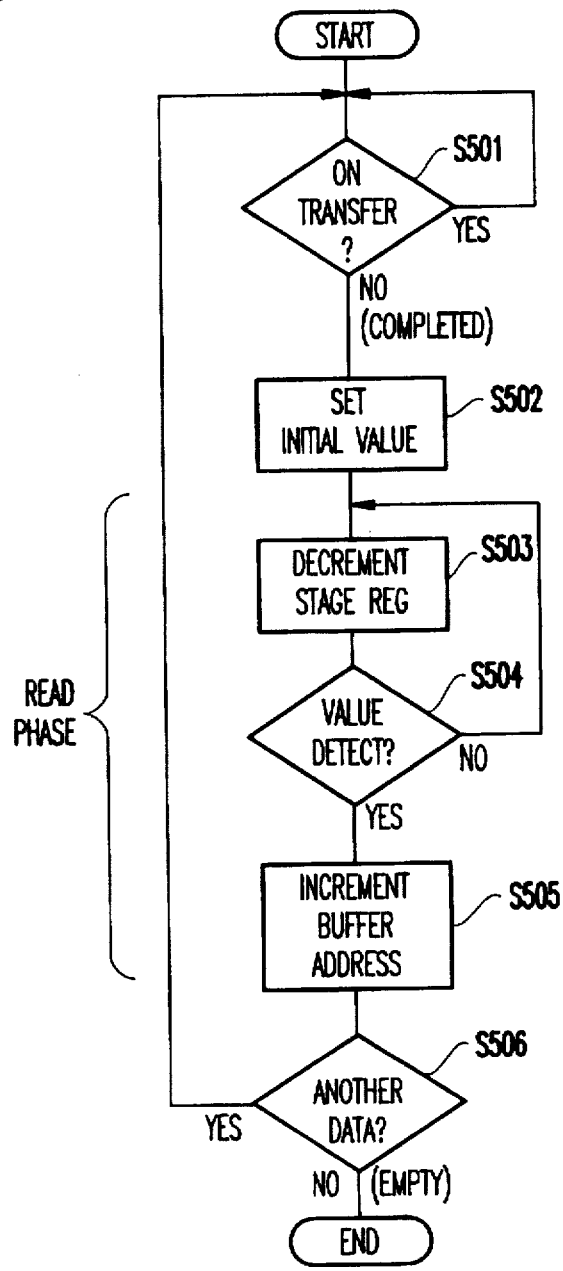
FIG. 4 is a flowchart illustrating a transfer operation according to the first embodiment (as well as to a second embodiment discussed with regard to FIG. 6) of the data transfer apparatus according to the present invention.
Figure 5:
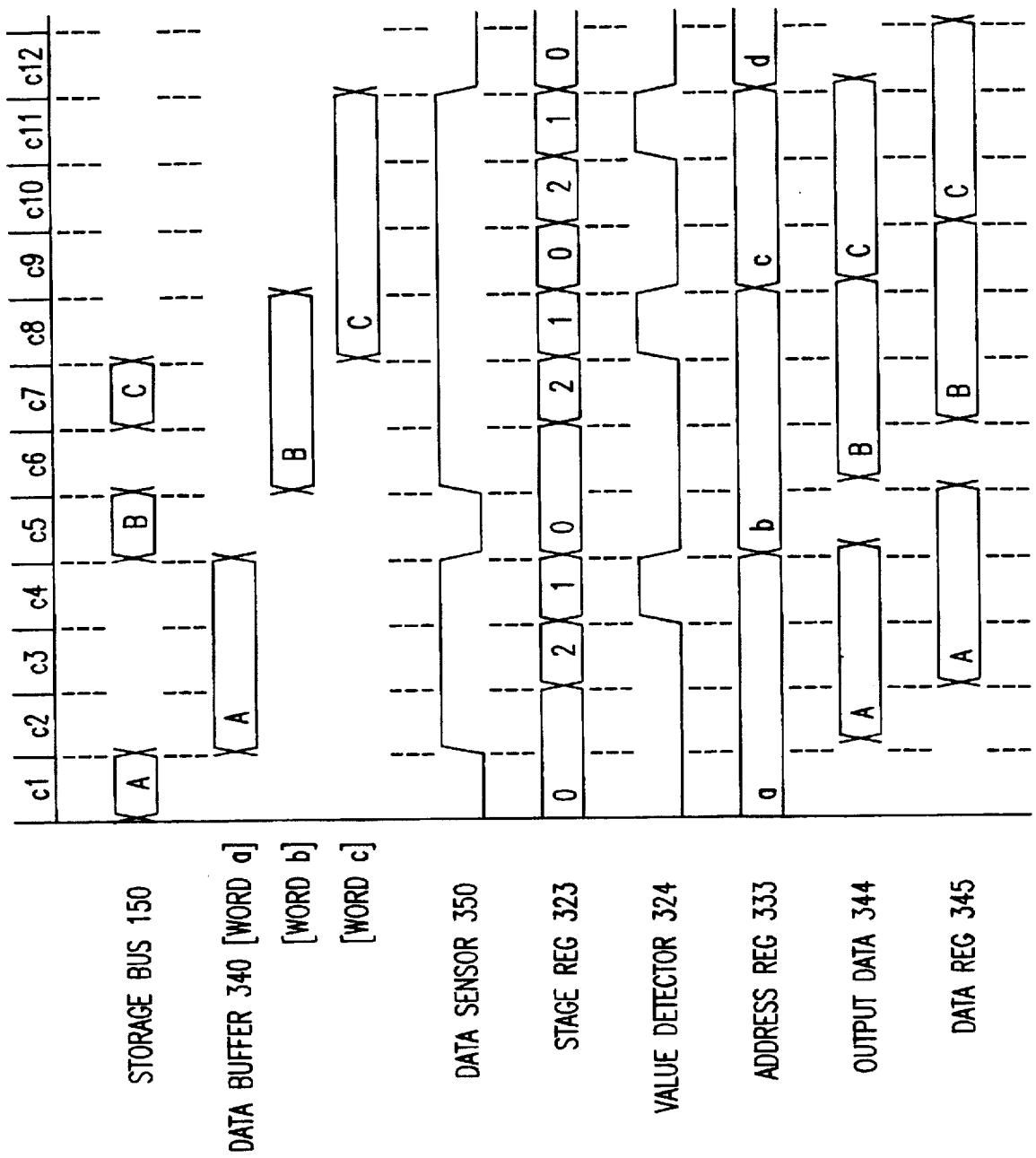
FIG. 5 is a timing chart illustrating a transfer operation according to the first and second embodiments of the present invention.

Hereinbelow and referring to FIGS. 2, 4 and 5, the operation of the data transfer apparatus in accordance with the above-mentioned embodiment of the present invention will be described.

First, a data "A" to be transferred is assumed to be on the storage bus 150 at cycle C1. The data is stored to the word "a" of the data buffer 340 at cycle C2, and then the data sensor 350 indicates the data occupancy (e.g., of data ("A")) in the data buffer 340. The stage register 323 is checked to determine whether data is "on transfer" (step S501) (e.g., to determine if the data transfer operation occurring). Since a value "0" of the stage register 323 indicates data is not "on transfer", the stage register 323 is set to the initial value at cycle C3 (step 502). In this example, since the transfer clock cycle of the processor 200 is assumed to be three times larger than the clock cycle of the data transfer apparatus 300, the initial value is "2" as shown in FIG. 5.

The stage register 323 is decremented to "1" by decrementer 321 at cycle C4 (step S503). Thereafter, the value detector 324 detects the value of the stage register 323 (step S504). If the value "1" is detected, then the address register 333 is incremented to "b" at cycle C5 (step S505). If not, the process loops back to step S503. Simultaneously, the valid bit portion 342 of word "a" is cleared. Therefore, the data sensor 350 indicates the data empty status of the data buffer 340 at cycle C5 (step S506).

From cycle C3 to C5, the data register 345 holds data "A". Therefore, the processor 200 can receive the data "A" asynchronously at a suitable speed.

Next, since a data "B" to be transferred is on the storage bus 150 at cycle C5, the data is stored to the word "b" of the data buffer 340 at cycle C6, and the data sensor 350 indicates data occupancy in the data buffer 340 again. Since a value "0" of the stage register 323 indicates data is not "on transfer" (e.g., data not being transferred) (step S501), the stage register 323 is set to the initial value (e.g., "2") at cycle C7 (step S502).

The stage register 323 is decremented to "1" by the decrementer 321 at cycle C8 (step S503). The value detector 324 detects the value "1" of the stage register 323 at cycle C8 (step S504). Then, the address register 333 is incremented to "c" at cycle C9 (step S505). Simultaneously, the valid bit portion 342 of word "b" is cleared.

At this time, the data sensor 350 indicates the data occupancy of the data buffer 340 at cycle C9 (step S506), because a data "C", on the storage bus 150 at cycle C7, is stored to the word "c" of the data buffer 340 at cycle C8.

Since a value "1" of the stage register 323 indicates that data is being transferred at cycle C8 (step S501), the stage register 323 is set to the initial value at the next cycle C10, not at cycle C9(step S502).

The stage register 323 is decremented to "1" at cycle C11 (step S503). The value detector 324 detects the value "1" of the stage register 323 (step S504). Then, the address register 333 is incremented to "d" at cycle C9 (step S505). Simultaneously, the valid bit portion 342 of word "c" is cleared. Therefore, the data sensor 350 indicates the data empty status of the data buffer 340 at cycle C12 (step S506).

From cycle C7 to C9 and from C10 to C12, the data register 345 holds data "B" and "C", respectively. Therefore, the processor 200 can receive the data "B" and "C" asynchronously at a suitable speed.

Next, a data transfer apparatus in accordance with a second embodiment of the present invention will be described with reference to FIG. 6.

Figure 6:
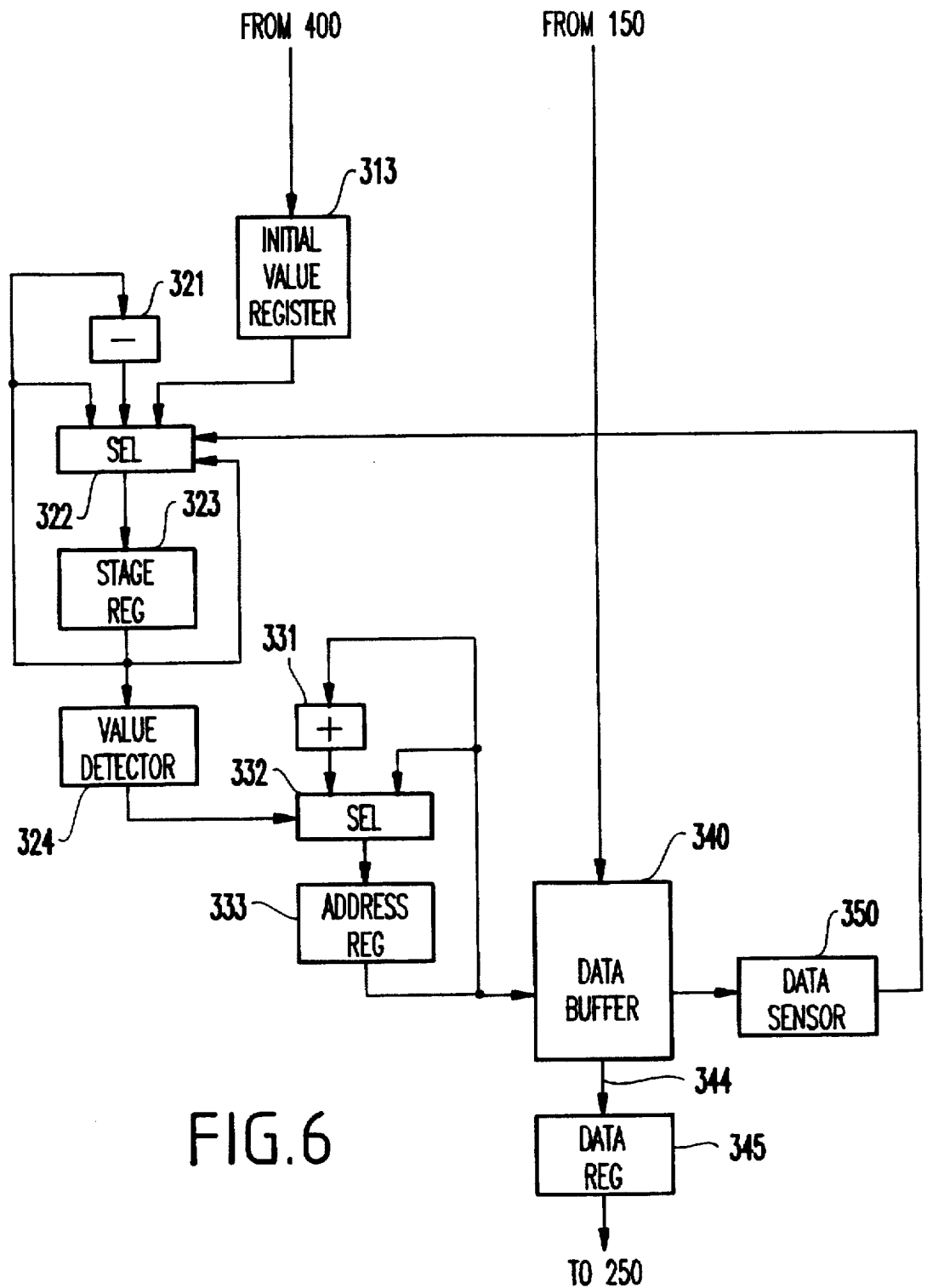
FIG. 6 is a block diagram showing the configuration of an asynchronous data transfer apparatus according to the second embodiment of the present invention.

Referring to FIG. 6, the second embodiment of the invention has an initial value register 313, instead of the initial value memory 311 and the speed register 312 of the first embodiment described above.

The initial value register 313 holds an initial value to be input to the stage register 323. The initial value register 313 is connected to the diagnostic processor 400. The diagnostic processor 400 may set the initial value to the initial value register 313 directly as shown in FIG. 6. The initial values to be set to the initial value register 313 are chosen with, for example, the criteria as described for the first embodiment.

The data transfer apparatus in accordance with the second embodiment of the present invention operates similarly to the first embodiment except for the setting operation of the initial value register 313.

As is apparent from the above description, according to the present invention, since the address for the data buffer is updated at predetermined time intervals, an output speed is controllable fixedly. Thus, the receiver can receive the data in a suitable speed without the transmitter having to check the acknowledge signal.

While the invention has been described in terms of several preferred embodiments, those skilled in the art will recognize that the invention can be practiced with modification within the spirit and scope of the appended claims.

What is claimed is:

1. A data transfer apparatus, coupled between a transmitter and a receiver, comprising:

means for receiving data from said transmitter; and means for outputting said data to said receiver, wherein said data transfer apparatus transfers said data from said transmitter to said receiver fixedly in a time interval determined in accordance with a data transfer cycle of said data transfer apparatus and a data transfer cycle of said means for receiving data, wherein said means for receiving data includes a data sensor for sensing data in said receiving means, and wherein said outputting means includes:

a speed register for holding a transfer speed to be used in transferring data to said receiver;

an initial value holder, indexed by the speed register, for holding an initial value;

a stage register for indicating an operation data transfer to the receiver;

a decrementer for decrementing the stage register;

a selector coupled to receive an input from the stage register, an input from said initial value memory, and an input from said decrementer; and a value detector for receiving an output from the stage register;

wherein said selector selects one of an output of the initial value memory, an output of the stage register, and an output of the decrementer depending upon the output of the stage register and an output of said data sensor.

2. The data transfer apparatus according to claim 1, wherein said data transfer apparatus transfers said data from said transmitter to said receiver without feedback being received by said transmitter from said receiver.

3. A data transfer apparatus, coupled between a transmitter and a receiver, comprising:

a data buffer for holding data from said transmitter;

a data sensor for sensing data in said data buffer;

a first counter for indexing said data buffer;

a second counter for counting cycles in an operation phase of a data transfer to said receiver and for incrementing said first counter; and an initial value bolder for holding an initial value for said operation phase, wherein said second counter includes:

a speed register for holding a transfer speed to be used in transferring data to said receiver and for indexing said initial value holder:

a stage register for indicating an operation phase of data transfer to the receiver and for receiving initial values from said initial value holder;

a decrementer for decrementing the stage register;

a selector coupled to receive an input from the stage register, an input from said initial value memory, and an input from said decrementer; and a value detector for receiving an output from the stage resister, wherein said selector selects one of an output of the initial value holder, an output of the stage register, and an output of the decrementer depending upon the output of the stage register and an output of said data sensor.

4. The data transfer apparatus as claimed in claim 3, wherein said second counter includes a stage register for holding a value representing the operation phase of data transfer to said receiver.

5. The data transfer apparatus as claimed in claim 4, wherein said second counter further includes a value detector for detecting whether a value of said stage register includes a predetermined value, and for incrementing said first counter when said stage register includes said predetermined value.

6. The data transfer apparatus as claimed in claim 5, further including a data sensor for sensing whether said data buffer stores any data, wherein said first counter comprises an address counter and said second counter comprises a phase counter.

7. The data transfer apparatus as claimed in claim 3, further including a data sensor for sensing whether said data buffer stores any data.

8. The data transfer apparatus as claimed in claim 3, wherein said initial value holder includes an initial value memory for storing an initial value for said operation phase.

9. The data transfer apparatus as claimed in claim 8, wherein said initial value is selected from a value calculated from "(A P)−1", wherein "A" represents a clock cycle of the data transfer apparatus, and "P" represents a transfer clock cycle of said receiver.

10. The data transfer apparatus as claimed in claim 8, wherein said initial value holder further includes a speed register for holding an index for said initial value memory.

11. The data transfer apparatus as claimed in claim 10, wherein said initial value is selected from a value calculated from "(A/P)", wherein "A" represents a clock cycle of the data transfer apparatus, and "P" represents a transfer clock cycle of said receiver.

12. The data transfer apparatus as claimed in claim 3, wherein said initial value holder includes an initial value register for storing an initial value for said operation phase.

13. The data transfer apparatus as claimed in claim 12, wherein said initial value is selected from a value calculated from "(A/P)−1", wherein "A" represents a clock cycle of the data transfer apparatus, and "P" represents a transfer clock cycle of said receiver.

14. The data transfer apparatus as claimed wherein said initial value is selected from a value calculated from "(A/P)−1", wherein "A" represents a clock cycle of the data transfer apparatus, and "P" represents a transfer clock cycle of said receiver.

15. The data transfer apparatus as claimed in claim 14, wherein:

said second counter includes a stage register for holding a value representing the operation phase of data transfer to said receiver;

said second counter further includes a value detector for detecting whether a value of said stage register includes a predetermined value, and for incrementing said first counter when said stage register includes said predetermined value; and said data transfer apparatus further includes a data sensor for sensing whether said data buffer stores any data.

16. The data transfer apparatus according to claim 3, wherein said data transfer apparatus transfers said data from said transmitter to said receiver without feedback being received by said transmitter from said receiver.

17. A data transfer system, including:

a transmitter;

a receiver for receiving data from said transmitter; and a data transfer apparatus coupled between said transmitter and said receiver, wherein said data transfer apparatus transfers a data from said transmitter to said receiver fixedly in a time interval determined in accordance with a data transfer cycle of said data transfer apparatus and a data transfer cycle of said receiver, said data transfer apparatus comprising:

a speed register for holding a transfer speed to be used in transferring data to said receiver;

an initial value holder, indexed by the speed register for holding an initial value;

a stage register for indicating an operation phase of data transfer to the receiver;

a decrementer for decrementing the stage register;

a selector coupled to receive an input from the stage register, an input from said initial value memory, and an input from said decrementer;

a value detector for receiving an output from the stage register; and a data sensor for sensing data transmitted by said transmitter, wherein said selector selects one of an output of the initial value memory, an output of the stage register, and an output of the decrementer depending upon the output of the stage register and an output of said data sensor.

18. The data transfer system as claimed in claim 17, wherein said data transfer apparatus receives a data from said transmitter asynchronously, and sends said data to said receiver asynchronously.

19. The data transfer system according to claim 17, wherein said data transfer apparatus transfers said data from said transmitter to said receiver without feedback being received by said transmitter from said receiver.

20. A data transfer apparatus, coupled between a transmitter and a receiver, comprising:

an initial value holder for holding an initial value for an operation phase of data transfer to the receiver;

a speed register for holding a transfer seed to be used in transferring data to said receiver and for indexing said initial value holder;

a data buffer for holding data from said transmitter;

a data sensor connected to the data buffer for sensing whether said data buffer stores any data;

a first counter for indexing said data buffer; and a second counter for counting cycles in an operation phase of data transfer to said receiver and for incrementing said first counter, wherein said second counter includes:

a stage register for holding a value representing an operation phase of data transfer to said receiver;

a decrementer for decrementing the stage register;

a selector coupled to receive an input from the stage register, an input from said initial value memory, and an input from said decremeter; and a value detector for detecting whether a value of said stage register includes a predetermined value and for incrementing said first counter when said stage register includes said predetermined value, wherein said selector selects one of an output of the initial value holder, an output of the stage register, and an output of the decrementer depending upon the output of the stage register and an output of said data sensor.

21. The data transfer apparatus as claimed in claim 20, wherein said data buffer includes a valid bit portion in each entry for indicating whether a respective entry stores any data and said data sensor responsive to valid bit portions of each entry of the data buffer for sensing whether said data buffer stores any data.

22. The data transfer apparatus as claimed in claim 20, wherein said second counter further includes a decrementer responsive to a value in said stage register for outputting a decremented value, said selector receiving said decremented value and selecting among said initial value, said value in said stage register and said decremented value in response to said control signal from said data sensor and said stage register.

23. The data transfer system according to claim 20, wherein said data transfer apparatus transfers said data from said transmitter to said receiver without feedback being received by said transmitter from said receiver.

* * * * *